US007654462B2

(12) United States Patent
Casey

(10) Patent No.: US 7,654,462 B2
(45) Date of Patent: Feb. 2, 2010

(54) MOBILE DEVICE BASE STATION FOR ENHANCED SIGNAL STRENGTH FOR ON-DEMAND MEDIA SERVICES

(76) Inventor: Steven M. Casey, 6265 W. Sumac Ave., Littleton, CO (US) 80123

( * ) Notice: Subject to any disclaimer, the term of this patent is extended or adjusted under 35 U.S.C. 154(b) by 443 days.

(21) Appl. No.: 11/292,210

(22) Filed: Nov. 30, 2005

(65) Prior Publication Data

US 2006/0184978 A1 Aug. 17, 2006

Related U.S. Application Data

(63) Continuation-in-part of application No. 11/060,222, filed on Feb. 16, 2005, now Pat. No. 7,165,725.

(51) Int. Cl.
*G06K 7/10* (2006.01)
*G06F 15/16* (2006.01)

(52) U.S. Cl. ................................. 235/472.01; 709/219

(58) Field of Classification Search ........................ 235/472.01–473.03; 705/26; 709/219
See application file for complete search history.

(56) References Cited

U.S. PATENT DOCUMENTS

| | | | | |
|---|---|---|---|---|
| 5,528,285 | A | 6/1996 | Morikawa et al. | |
| 5,557,541 | A * | 9/1996 | Schulhof et al. | 700/94 |
| 5,572,442 | A * | 11/1996 | Schulhof et al. | 709/219 |
| 5,812,790 | A | 9/1998 | Randall | |
| 5,887,243 | A | 3/1999 | Harvey et al. | |
| 5,991,596 | A | 11/1999 | Cunningham et al. | |
| 6,163,691 | A | 12/2000 | Buettner et al. | |
| 6,192,340 | B1 * | 2/2001 | Abecassis | 704/270 |
| 6,256,691 | B1 | 7/2001 | Moroz et al. | |
| 6,330,462 | B1 | 12/2001 | Chen | |
| 6,341,133 | B1 | 1/2002 | Kawamoto et al. | |
| 6,532,593 | B1 | 3/2003 | Moroney | |
| 6,556,217 | B1 | 4/2003 | Makipaa et al. | |
| 6,658,268 | B1 | 12/2003 | Bodnar et al. | |
| 6,741,684 | B2 | 5/2004 | Kaars | |
| 6,931,257 | B2 | 8/2005 | Shahidi et al. | |
| 6,941,154 | B1 | 9/2005 | Ritter | |
| 6,947,758 | B2 * | 9/2005 | Nguyen | 455/466 |
| 6,950,624 | B2 | 9/2005 | Kim et al. | |

(Continued)

FOREIGN PATENT DOCUMENTS

EP 0793164 A2 9/1997

OTHER PUBLICATIONS

*Sony MSV-A1—Portable TV*, http://www.dynamism.com/msv-aV, dated Jul. 29, 2004, 1 page.
*Sony Portable TV & MPEG4 recorder*, http://www.icube.us/sony_msv-al/product_overview.htm, dated Jul. 20, 2004, 1 page.

(Continued)

*Primary Examiner*—Jamara A Franklin

(57) ABSTRACT

Embodiments of the present invention provide systems and methods for capturing on-demand media content for use with portable media devices, including wireless phones, using a based station to provide for enhanced signal strength capture. These embodiments provide for the reception/distribution of on-demand media content, which can include, among other things, video content (such as television programming, movies, etc.), audio content (such as radio programming, audio recordings, etc.), data content (such as Internet data—web pages, electronic mail, etc.), voice transmissions (such as telephone transmissions, etc.) and/or the like.

34 Claims, 6 Drawing Sheets

U.S. PATENT DOCUMENTS

| | | | | |
|---|---|---|---|---|
| 6,959,260 | B2 | 10/2005 | Rodman et al. | |
| 7,016,643 | B1 | 3/2006 | Kuether et al. | |
| 7,209,900 | B2 * | 4/2007 | Hunter et al. | 705/58 |
| 7,346,549 | B2 * | 3/2008 | Deas et al. | 705/26 |
| 2002/0157101 | A1 | 10/2002 | Schrader et al. | |
| 2003/0050062 | A1 | 3/2003 | Chen et al. | |
| 2004/0111756 | A1 | 6/2004 | Stuckman et al. | |
| 2004/0204145 | A1 | 10/2004 | Nagatomo | |
| 2004/0266336 | A1 * | 12/2004 | Patsiokas et al. | 455/3.04 |
| 2005/0068417 | A1 | 3/2005 | Kreiner et al. | |
| 2005/0122435 | A1 | 6/2005 | Yunoki | |
| 2005/0232284 | A1 | 10/2005 | Karaoguz et al. | |
| 2006/0101116 | A1 | 5/2006 | Rittman et al. | |

OTHER PUBLICATIONS

*Television is coming to a cell phone near you*, http://pd/pennnet.com/Article_Display.cfm?Section=Articles&Subscription=Display&ARTICLE_ID; dated Jul. 20, 2004, 4 pages.

U.S. Appl. No. 11/060,222, Notice of Allowance dated Nov. 17, 2006, 7 pgs.

U.S. Appl. No. 11/060,222, Office Action dated Jan. 24, 2006, 9 pgs.

U.S. Appl. No. 11/060,222, Office Action dated Jun. 15, 2006, 10 pgs.

U.S. Appl. No. 11/060, 222, Office Action dated Oct. 19, 2005, 7 pgs.

Xvision Systems, Play and Convert your media files; mp3, wave, asf, avi, mpg and more . . . , *About MPG, MPEG-4*, http://www.xvonline.com/xfiles/abount_mpg.htm, dated Oct. 28, 2004, 2 pages.

* cited by examiner

MOBILE DEVICE BASE STATION FOR ENHANCED SIGNAL STRENGTH FOR ON-DEMAND MEDIA SERVICES

CROSS-REFERENCES TO RELATED APPLICATIONS

This application claims the benefit of and is a continuation-in-part of U.S. application Ser. No. 11/060,222, entitled MOBILE DEVICE BASE STATION FOR ENHANCED SIGNAL STRENGTH FOR MEDIA SERVICES filed Feb. 16, 2005, the complete disclosure of which is incorporated herein by reference.

This application is related to the following commonly-owned applications, of which the entire disclosure of each is incorporated herein by reference: U.S application Ser. No. 11/060,633, filed Feb. 16, 2005 by Steven M. Casey and entitled "MEDIA SERVICES MANAGER FOR BASE STATION"; U.S application Ser. No. 11/060,224, filed Feb. 16, 2005 by Steven M. Casey and entitled "WIRELESS DIGITAL VIDEO RECORDER"; and U.S application Ser. No. 11/060,219, filed Feb. 16, 2005 by Steven M. Casey and entitled "WIRELESS DIGITAL VIDEO RECORDER MANAGER."

This application is further related to the following commonly-owned, co-pending applications (the "NPVR Applications"), of which the entire disclosure of each is incorporated herein by reference: U.S. patent application Ser. No. 11/291,326, filed on a date even herewith by Casey et al. and entitled "Network-Based Format Conversion"; U.S. patent application Ser. No. 11/291,806, filed on a date even herewith by Casey et al. and entitled "Networked Content Storage"; and U.S. patent application Ser. No. 11/291,325, filed on a date even herewith by Casey et al. and entitled "Personal Broadcast Channels"; and U.S. patent application Ser. No. 11/291,324, filed on a date even herewith by Casey et al. and entitled "Networked Personal Video Recorder System and Methods".

BACKGROUND OF THE INVENTION

The present invention relates generally to the field of docking stations for portable media devices. More specifically, embodiments of the present invention provide methods and systems for effectively gathering and managing on-demand media content at a docking station at enhanced signal strengths for use in a portable media device. The present invention also relates generally to the distribution of on-demand media content over a network between a plurality of docking stations.

In recent years, with advances in media technology, in particular the developments in digital electronics, more and more mobile media devices are being produced. In particular, wireless phones are now capable of many media functions are being produced in large volumes. Consequently, it is more and more likely that media content will increasingly be viewed on portable media devices, rather than personal computers. These new portable media devices will be either new products, such as email readers and Internet radios, or existing products with new features, such as wireless phones with media capabilities (as discussed previously), MP3 players, personal digital assistants ("PDAs"), and the like. The success of all these new portable media devices will depend upon the ability to effectively provide desirable media content to the media user that is interesting and of a quality so that the user does not use a less mobile media device, such as a standard personal computer, to access the content. With regard to effective access to media content, it is highly desirable for users to be able to easily select and receive media content for their portable media devices where the reception must be of a high standard.

As such, there now exists in the marketplace a need for effectively providing the new portable media devices with media content. Currently, media content is, in general, provided to users on memory cards or the like on which the media content is stored. The memory cards storing the media content may be purchased by users of the portable media devices or the users may record content to memory cards for use on their portable media devices using their personal computer and/or other recording device. These methods of obtaining media content, however, either limit the wireless phone user to the media content that is available on pre-recorded memory cards or requires the user to have the knowledge and accessories to access content providers and to record media content to a memory card.

As an alternative to the use of memory cards, portable media devices may be adapted to directly receive media content through television tuners, satellite radio receivers, and the like. However, with mobile type devices, the reception of media content signals may be compromised by the mobility of the mobile media device due to, among other things, signal reception. Additionally, power usage and the ability of the device to contemporaneously receive and manage video content from multiple sources are problems existing in the art. Further, multiple sources of media content exist that a user of a portable media device must connect to and access to download media content.

As well as issues concerning the downloading/uploading/reception of media content by portable devices there is also a trend wherein consumers desire to view (and/or listening to, interacting with, etc.) media content when and where they desire. For example, a typical consumer, instead of waiting until a given broadcast window to watch a desired program, might request the program on-demand, at the time the consumer desires to watch/download the program.

The present invention provides further enhancements to media reception at a base station including this on-demand model of content consumption.

BRIEF SUMMARY OF THE INVENTION

Embodiments of the present invention solve at least the problems discussed above by providing a base station system and method for capturing on-demand media content for use with portable media devices, including wireless phones. Offering several applications in the technical arts, embodiments of the present invention provide a method and a system for receiving and/or managing on-demand media content at a base station for use in a portable media device. Further, embodiments of the present invention provide methods and systems for the reception/distribution of on-demand media content, which can include, among other things, video content (such as television programming, movies, etc.), audio content (such as radio programming, audio recordings, etc.), data content (such as Internet data—web pages, electronic mail, etc.), voice transmissions (such as telephone transmissions, etc.) and/or the like.

Some embodiments of the present invention relate to systems and methods for receiving, storing and/or managing on-demand media content for use on wireless phones with media capabilities. In certain embodiment of the present invention, a base station capable of receiving, storing and/or managing on-demand media content is disclosed. In some embodiments of the present invention, the base station may be operable to receive on-demand media content and transfer the received media content to a portable media device. The portable media device may be a device capable of playing the media content transferred from the base station to a user of the portable media device. In certain aspects, the portable media device may be a wireless phone with the capability of playing media content.

The base station may be connected with on-demand media content sources in many different ways to provide for a wide variety of media content and for the optimization of the related media content delivery. Further, the base station may be equipped with a plurality of receiving interfaces providing for reception of on-demand media content in different formats. In some embodiments, the base station may be associated with a payment engine to provide for payment of the on-demand content received by the base station. Alternatively or in combination with a payment engine, the base station may be associated with a processor to provide feedback to an on-demand media content provider.

A particular set of embodiments, for example, can enable the provision of content-on-demand services (such as, for example, video on demand). Another set of embodiments can allow a service provider to integrate real-time programming (such as news, sports, important updates and/or the like) with on-demand content, enabling unforeseen flexibility in the provision of content to subscribers. Certain embodiments feature novel solutions to deal with network storage requirements, while other embodiments allow for the provision of personalized content "channels" (sometimes referred to herein as "personal broadcast channels"), which may be analogous to the broadcast channels currently known in the art, but which may be customizable by a subscriber to allow the subscriber to specify the content that will be provided on a particular "channel." Hence, embodiments of the invention provide a variety of new solutions to provide content to a subscriber. Certain embodiments provide "downloadable" content to a subscriber. As used herein, the term "downloadable" should be interpreted in a broad sense, to include any type of content that may be transferred for consumption by a subscriber. Such content may include, merely by way of example, file downloads, streaming content, broadcast content, etc. Downloads may be initiated by the subscriber, by the system, and/or by another, depending on the embodiment.

BRIEF DESCRIPTION OF THE DRAWINGS

The present disclosure is described in conjunction with the appended figures.

Figure 1:
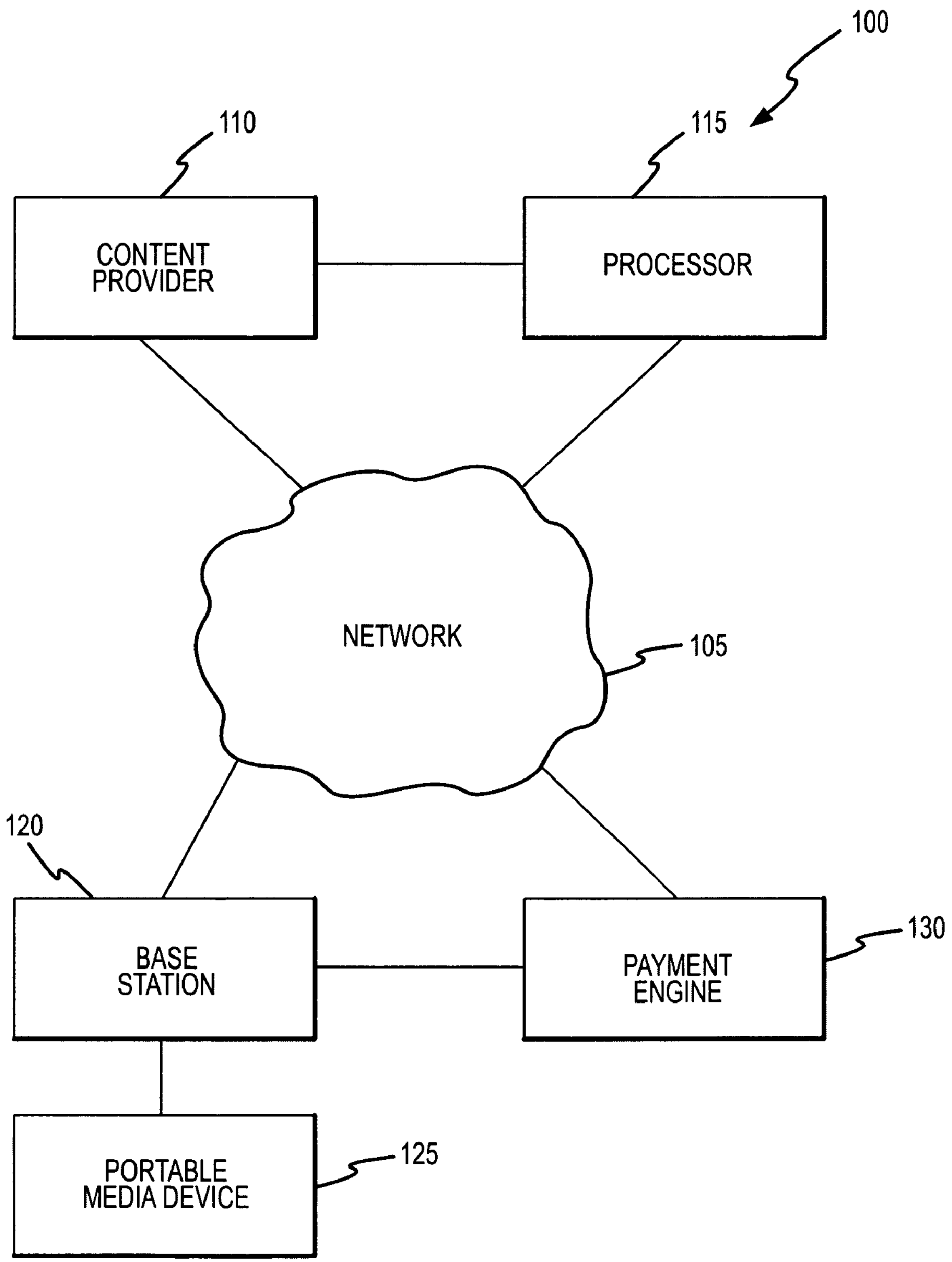
FIG. 1 is a functional diagram illustrating an embodiment for providing on-demand media content services to a base station for use with a portable media device.

In the appended figures, similar components and/or features may have the same reference label.

DETAILED DESCRIPTION OF THE INVENTION

The ensuing description provides preferred exemplary embodiment(s) only and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but the process could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the following description, for the purposes of explanation, specific details are set forth in order to provide a thorough understanding of the invention. However, it will be apparent that the invention may be practiced without these specific details.

Merely by way of example, FIG. 1 illustrates a system 100 that may be used to provide content-on-demand services to a base station for use with a portable media device. The system 100 may include a communication network 105, which can be any of several different types of communication networks. Merely by way of example, the network 105 may be the Internet. In other embodiments, the network 105 may be a telecommunication provider's network, including for example, an asynchronous transfer mode ("ATM") network, a time-division multiplexed ("TDM") network, a wireless network (including, for instance, cellular networks, personal communication service ("PCS") networks, 802.11 networks, and the like), and/or a cable television distribution network. In many cases, the network 105 may be a composite of a plurality of these (and other) types of networks. In short, the network 105 may be any public or private network capable of transporting media content (e.g., video, audio, data, etc.). In some cases, the network 105 may be capable of transmitting packeted data, for instance, data formatted according to the TCP/IP suite of protocols.

In some embodiments, the system 100 may include (and/or be in communication with) one or more media content providers 110, which may be television studios and/or broadcasters, radio broadcasters, motion picture studios, data providers, providers of streaming videos, gaming providers, etc. Depending on the embodiments, a media content provider 110 may be any entity that provides media content (in any suitable form) that may be provided on demand to a subscriber. In certain embodiments, one or more of the content provider(s) 110 may have agreements with a service provider to provide on-demand content for distribution to subscribers. Such agreements may provide for: (a) per-viewing fees payable from the service provider to the content provider; (b) the insertion of advertisements (by the service provider, the content provider and/or a third-party) into on-demand content provided to subscribers; (c) restrictions upon how the content may be provided (e.g., viewing windows during which certain content may or may not be provided, terms governing the provision of on-demand content, etc.); (d) terms related to digital rights management; (e) terms related to the tracking of content provided to subscribers; (e) subscriber feedback to provided media content; and/or (e) other terms regarding supply/distribution of on-demand content. In other embodiments, the subscribers may be able to directly access the content providers and arrange terms and conditions with the content providers for receiving media content on-demand.

The content provider 110 may be connected to a base station 120 via the network 105. In particular embodiments, for example, the base station may be configured as a subscriber device and/or a subscriber connectivity device (as described in more detail in the NPVR Applications, for example). As such, a user of the base station 120 may request delivery of media content on demand from the content provider 110 to be delivered to the base station 110. In certain aspects, the user may request delivery of on-demand content to the base station 120 for subsequent use on a portable media device 125. As such, the user may request delivery of the on-demand content from the content provider 110 for convenient periods so that the user may coordinate viewing of the on-demand content on the portable media device 125. Merely by way of example, the user may request delivery of on-demand content over-night for viewing the next day. As such, embodiments of the present invention provider the user with a convenient/user-friendly ability to receive media content on-demand with enhanced signal delivery to the base station 120 for use on a portable media device.

In some embodiments, the base station 120 may collect content for delivery to the portable media device 125. In such an application, some type of storage may be necessary. Storage is well known in the art, and does not need to be discussed in detail. As an example that is not intended to be a limitation, the storage may comprise a disk drive or smart media.

In certain embodiments, a processor 115 may be associated with the content provider 110 to control the delivery of on-demand content to the base station 115. Merely by way of example, the processor 115 may communicate with the base station 120 and provide the content in an appropriate format, etc. (In a set of embodiments, the processor 115 may be incorporated in an NPVR, as described in the NPVR Applications, for example.) In other aspects, the processor 115 may provide that the on-demand content is delivered to the base station at an appropriate time. In yet other aspects, the processor may contain a profile of a user associated with the base station 120 and may provide for the insertion of advertisements into the on-demand content in response to this profile. In still further aspects, the processor 115 may provide for the best routing of the media content to the base station 120 over the network 105.

In certain embodiments, the base station 120 may be coupled with a payment engine 130. The payment engine 130 may contain payment details for the user, such as credit card information, values credited to the user from payments made to the content provider and/or a party associated with the base station, etc. The payment engine may communicate with the processor 115 and/or the content provider 110 to provide payment for the on-demand content. Alternatively or in combination with such a system, the payment engine 130 may record on-demand content received by the base station 120 and communicate this information to the processor 115, the content provider 110 and/or a party associated with networking the base station 120 with the on-demand content provider 110, to provide for billing of on-demand content received by the base station 120.

To help a user select on demand content, The base station 120 and/or the payment engine 130 may be configured to communicate with a content guide. This content guide, as described below, may be configured to display available on-demand media content. Additionally, the content guide may interactively provide a way for a user to request on-demand media content.

In some embodiments, a user may access the content guide using the base station 120 and/or the payment engine 130. The content guide may be provided directly by the content providers. In such situations, the content guide may be provided to the base station on a periodic basis by the processor 115. Alternatively, the content guide may be obtained from a service that compiles content listings from multiple sources, such as a wireless provider with an agreements with several content providers. The user may select the desired on-demand content, which may be a combination of premium and non-premium or basic content. Non-premium and/or basic content may be provided to a subscriber at no charge, whereas premium content may require a payment from the subscriber. As described below, if the user selects premium content, the payment engine 130 may regulate access to the premium content. As described above, the payment engine 130 may be in communication with a processor 115. The processor 115 may serve, at least in part, as a clearinghouse for on-demand content or the provider of the content. Once payment has been made to the processor 115, the processor 115 may initiate DRM to the on-demand content supplied to the base station 120.

The payment engine 130 may be configured to accept payments from the user. In this installation, several payment methods may be accepted, such as credit card payment. Additional hardware may be added to process specific types of payment, such as a credit card reader. Alternatively, the payment engine 130 may be configured to authorize payment to an account. In this installation, a user may be able to accept premium content by authorizing payment from a terminal. This might be appropriate for pay-per-view events or for other installations where an account may exist, such as a hotel.

In yet another alternative, the payment engine 130 may be configured to automatically authorize services which are may be prepaid. For content that has a recurring fee, the payment engine 130 may communicate to the content provider that the content has already been purchased. Alternatively, the payment engine 130 may provide a method of entering codes to authorize delivery of the premium content.

In still further alternatives, on-demand media content of all types, including premium content, may be provided to the base station 120 without payment. In certain aspects, on-demand media content may be provided with advertising included, on-demand media content may be provided in exchange for feedback from the user of the base station 120, etc.

Depending on the implementation, several methods of "authorization" may be incorporated. In one embodiment, the payment engine 130 described above may be integrated with DRM. After accepting payment, the payment engine 130 may request a license from the on demand content provider 110. Alternatively, the payment engine 130 may request streaming of the content after payment.

Figure 2:
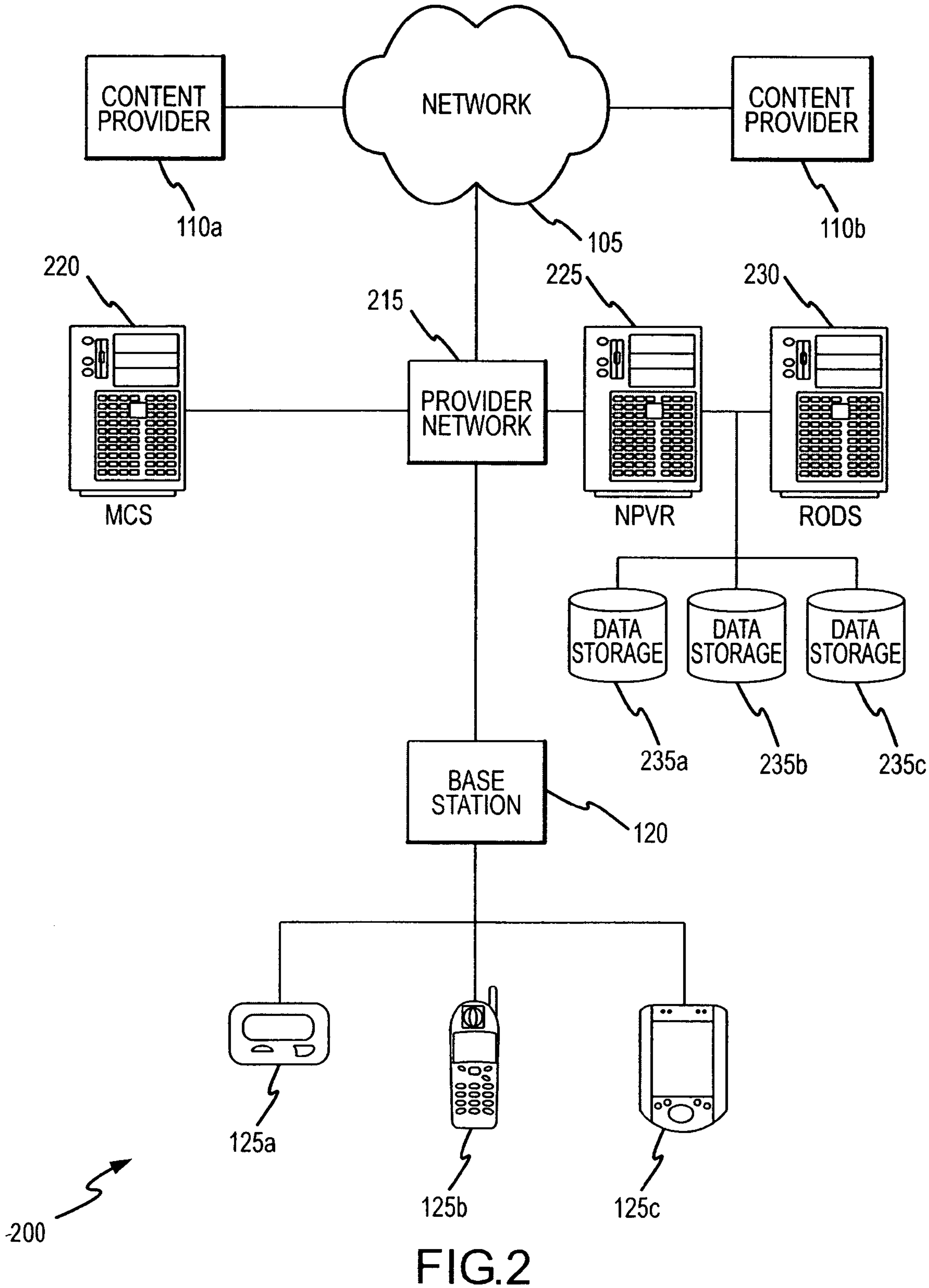
FIG. 2 is a functional diagram illustrating an alternate embodiment for delivering on-demand content to a base station.

FIG. 2 illustrates a system 200 that may be used to provide content-on-demand services over a service provider network to a base station to provide for enhanced signal delivery. The system 200 may include the communication network 105 over which on-demand content may be supplied by the content provider 110. In some embodiments, the system 200 may include (and/or be in communication with) one or more content providers 110. In the illustrated embodiment, the network 105 may be in communication with (and/or comprise and/or be incorporated within) a service provider network 215. One skilled in the art will appreciate that the configuration of the service provider network 215 generally will depend on the type of service that the service provider furnishes. Merely by way of example, if the service provider operates a POTS and/or DSL network, the service provider network 215 may comprise one or more switching and or devices (including without limitation service switching points ("SSP"), signal transfer points ("STP") and/or service control points ("SCP")), intelligent peripherals and/or other standard devices, as well, perhaps, as one or more interface devices and/or multiplexors, such as a digital subscriber line access multiplexer ("DSLAM"). As another example, if the service provider provides cable television services, the service provider network may comprise a cable television head end unit, as well, perhaps as supporting infrastructure. One skilled in the art will appreciate, based on the disclosure herein, that such standard devices may be modified to communicate with devices (including servers, storage devices, etc., as well as the devices described in detail in the NPVR Applications) configured to perform the functions described herein, and that such standard devices otherwise may be configured otherwise to perform in a manner known in the art and/or may be modified to perform functions of the invention.

Merely by way of example, the system 200 may further comprise a media conversion server ("MCS") 220 and/or a real-time on-demand ("ROD") server 230, which is described in further detail in the NPVR Applications.

As mentioned above, certain embodiments may provide a media conversion server. The media conversion application 205, then, may be capable of providing transcoding and/or conversion between a variety of standard and/or proprietary formats. In a set of embodiments, the media conversion application 205 may comprise a modular architecture, perhaps with one or more APIs, to allow for the development of additional conversion modules (which may be software, firmware, etc.) as standards evolve and/or new proprietary formats are developed. Exemplary formats that may be supported by the media conversion application 205 include, without limitation, MPEG video and audio formats (including MPEG2, MPEG4, H.264 and other standards); various broadcast formats (including high-definition formats such as 1080p, 1080i, 720p, 480p, 480i, NTSC, PAL, etc.); various Microsoft Windows Media (e.g., WMA and WMV) formats, including without limitation WM9, WM10 and VC-1 formats; various data formats, including without limitation, text, HTML, XML, etc.

As described in the NPVR Applications, the media conversion application 205 may be configured to convert among any of such formats as appropriate. Merely by way of example, if a subscriber wishes to listen to an audio portion of an MPEG video, the media conversion application 205 can be configured to extract the audio portion of the MPEG video file and/or save the audio portion as an MP3 file, which could be downloaded to a portable music player, for example. The media conversion application 205 may also be configured to change the resolution, bitrate, etc. as appropriate for various devices. Merely by way of example, if video content is provided as an MPEG stream (e.g., MPEG2, MPEG4, etc.), and the subscriber desires to view the content on a portable device (e.g., a wireless phone, PDA, etc.), it may be appropriate to downsample the content to an appropriate format (such as the quarter common interface format ("QCIF"), quarter video graphics array ("QVGA"), etc.). As another example, if a video stream is provided in a high-definition (e.g., 720p, 1080i, etc.) format and the subscriber's television supports only standard-definition television signals (480i) or digital television signals (480p), downconversion of the HD signal may be appropriate. As yet another example, the media conversion application 205 may be configured to convert an audio file (such as an MP3 file, WAV file, WMA file, etc.), which may be provided by the system and/or uploaded by a subscriber, to another format, such as a ringtone, etc., which may then be provided (as described herein) to an appropriate device, such as a wireless phone, etc.

In some embodiments, the service provider's network 215 (and/or components thereof) may be in communication with the base station 120. In certain embodiments of the present invention, the base station 120 may include a docking port through which the base station 100 can communicate with the portable media device 125. The communication connection between the portable media device 125 and the base station 120 may be a hard type connection, such as a cable, hot shoe, a male-female connector or the like. Standard interfaces (USB, 1394, etc.) and/or proprietary interfaces may be used. In different aspects or embodiments, communication between the base station 120 and the portable media device 125 may be by wireless connection—such as a WiFi connection, Bluetooth connection, infrared connection, and/or the like—or it may be a combination of a hard connection and a wireless connection.

In certain embodiments of the present invention, the base station 120 may include a user interface providing for the user of the base station 120 to interface with the base station 120 (and/or an NPVR) and/or to provide settings for receiving the on-demand content from the provider network 215. In some embodiments of the present invention, therefore, the base station 120 may include a plurality of communications ports for coupling the base station 120 with the provider network 215.

Figure 3:
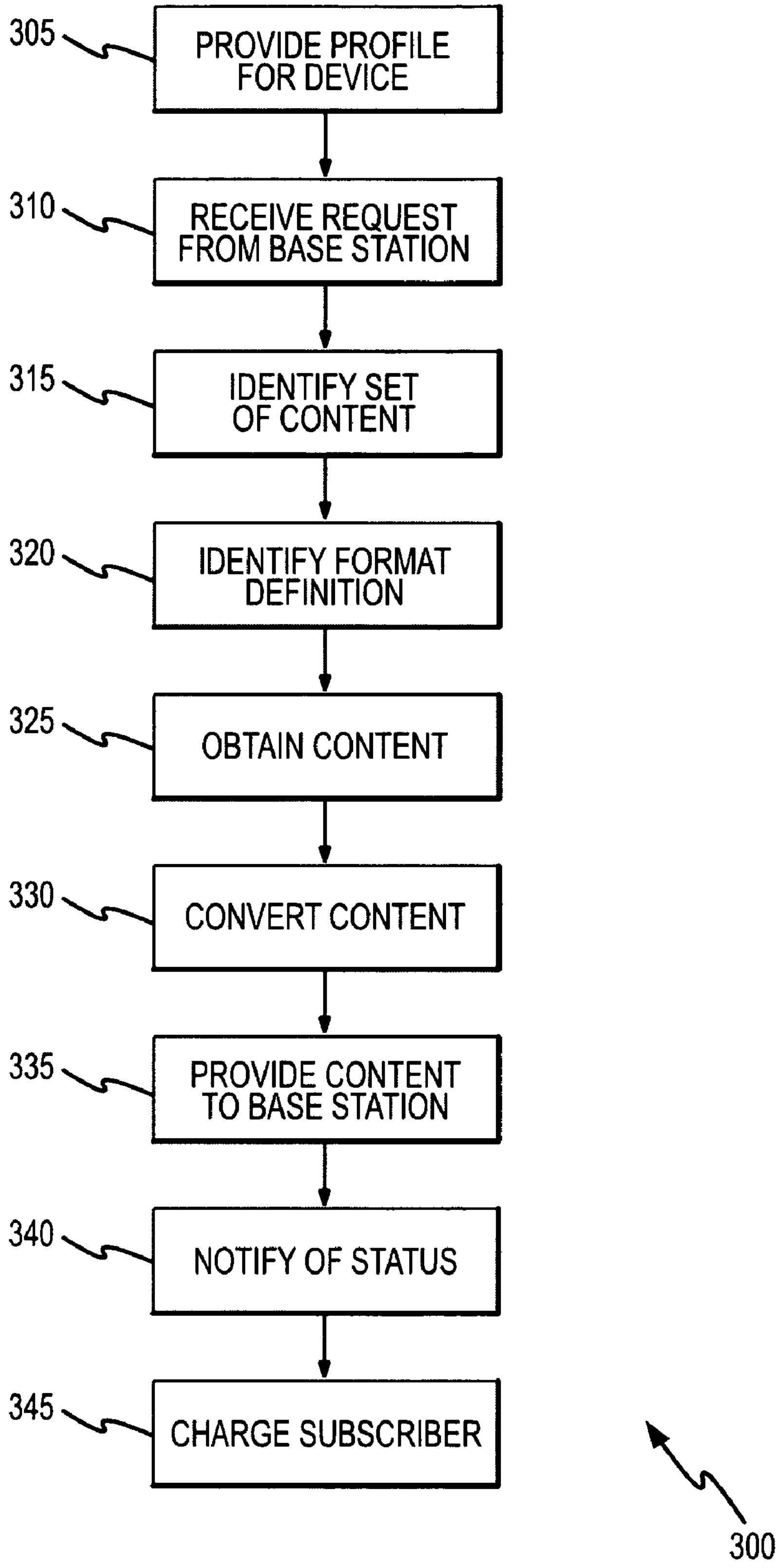
FIG. 3 is a flowchart illustrating a method for delivering on-demand content to a base station, in accordance with an embodiment of the present invention.
Figure 4A:
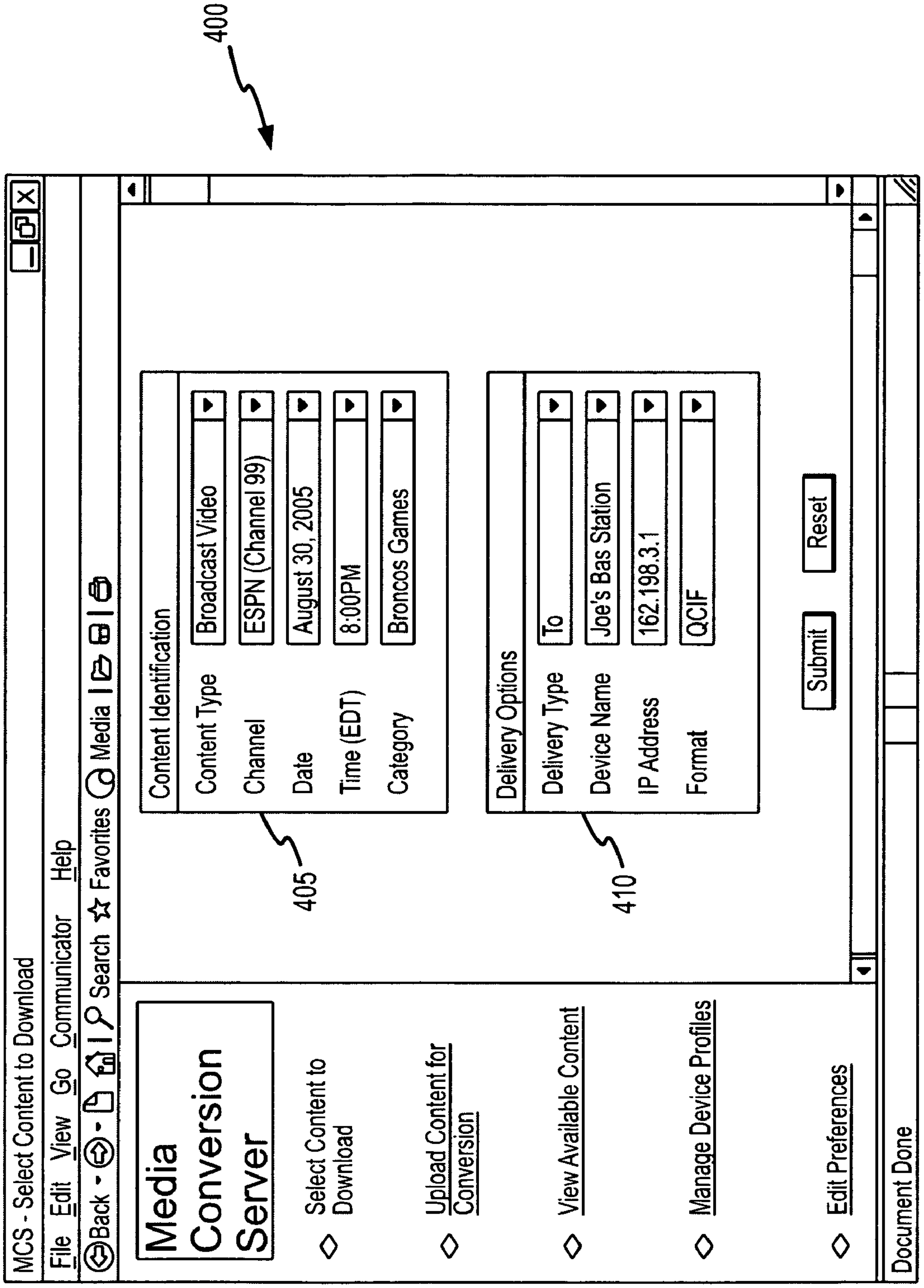
FIGS. 4*a*-4*c* illustrate exemplary screen displays in accordance with embodiments of the invention.

FIG. 3 provides a process flow diagram illustrating a generalized method 300 of providing on-demand media content to a base station. At block 310, a content request may be received from the base station. The request may be entered by a subscriber into the base station or a processor associated with the base station or the base station, utilizing rules entered by the subscriber, may on its own, without further subscriber input, make the request. As noted above, there are various ways in which a content request may be received, e.g., via a web page, via electronic mail, via a subscriber connectivity device, etc. The content request may (but also may not) identify a device (perhaps by reference to a set of content to be converted (and/or provided to the subscriber) is then identified (block 315). FIG. 4*a* illustrates an exemplary screen display 400 of a web page that may be used to allow a subscriber to submit a content request. The web page may provide a content identification window 405, which can allow the subscriber to identify the content to be converted, including, merely by way of example, the source (which, in the exemplary display 400 is "broadcast video"), as well, perhaps as specific options that relate to that content source (in this case, channel and date/time information).

In a particular set of embodiments, the subscriber may be allowed to define categories of content. Categories may be used to auto-profile content, such that for example, all content of a particular category is converted to a particular format, downloaded to a particular device (or set of devices) etc. Categories can also be used to enable the system to "autoselect" content that the subscriber likely would enjoy. Thus, for example, if the subscriber has defined a category for movies starring a particular actor, the system can automatically convert and/or provide content in this category.

The web page (and/or other interface, as described in the NPVR Applications, for example) may also allow the subscriber to specify various delivery options 410 (including, in this example, but not limited to, the type of delivery—e.g., to a device, by email, download, etc.), the device name, identifier, etc., as well, perhaps as a format for the content. It should be appreciated that, in some cases, the device name may be provided by the web page from among one or more devices for which profiles have been established. In such cases, default values for the other information (identifier, format, etc.) may be pre-selected for the subscriber (perhaps based on the device profile). Optionally, the subscriber may be given the option to modify the default values.

In a set of embodiments (as illustrated on FIG. 4*a*, for example), the content request may comprise sufficient information to allow the identification of the set of content to be converted/delivered. In other embodiments, (such as when no content request is received and/or the content request contains insufficient information to identify a particular set of content for conversion/delivery), other procedures may be used to identify the set of content to be downloaded. Merely by way of example, in some embodiments, the subscriber may have a standing request for a certain type of content (e.g., action movies starring a particular actor, music from a particular recording artist, etc.), and as such content becomes available, it may be identified (perhaps by an NPVR, etc.). In yet other embodiments, content may be identified automatically, perhaps based on similarities to other content (e.g., type of content, actors, producers, artists, etc.) previously requested by subscriber. Based on the disclosure herein, one skilled in the art will appreciate that there are a variety of procedures by which content may be identified.

Returning to FIG. 3, at block 325, a format definition for the request content is identified. In a set of embodiments, for example as described above, a profile for a particular device may be consulted to identify the appropriate format definition for that device. In other embodiments, other procedures may be used to identify the appropriate format definitions. Merely by way of example, the content request, as opposed to (or in addition to) specifying a device for delivery of the content, may specify a format in which the content is to be delivered and/or provided. (In such cases, the content may be—but need not necessarily be—stored, e.g., at an NPVR and/or content library for acquisition—by download, electronic mail, etc.—by the subscriber, such that the subscriber can manually deliver the content to the desired device. In this way, the subscriber may not need to specify a particular device for delivery of the content at the time of making the content request.)

Figure 4B:
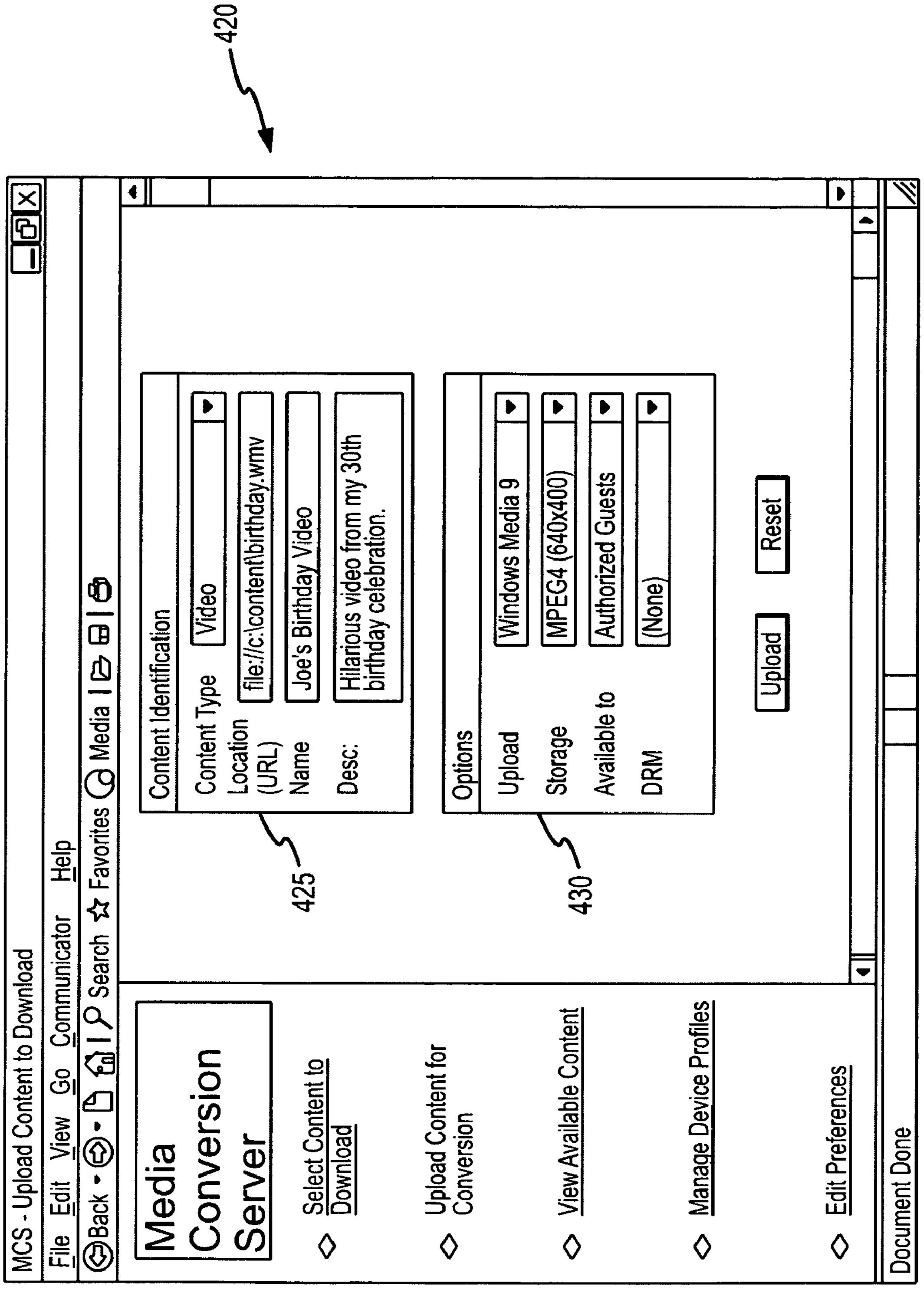

At block 325, the content to be converted and/or provided is obtained, usually from a content source. Various ways in which content may be obtained are described above and in the NPVR Applications. As noted above, one way in which content may be obtained is to allow the subscriber (and/or another to upload content to be converted, and one possible method of allowing the upload of content is via a web page. FIG. 4*b* illustrates an exemplary screen display 420 of a web page that can allow a subscriber (and/or another to upload content). The web page may provide a window 425 for the user to specify various information (including content location, such as via a URL, content name and/or description, etc.), as well as a window 430 to describe various options related to the content (such as the upload format—that is, the format in which the MSC should expect the content to be uploaded—the storage and/or download format, the users to whom the content should be made available, and/or any digital rights management options to be applied to the content). As another example, content may be obtained from an NPVR and/or from another content source (such as a video broadcast, etc).

Figure 4C:
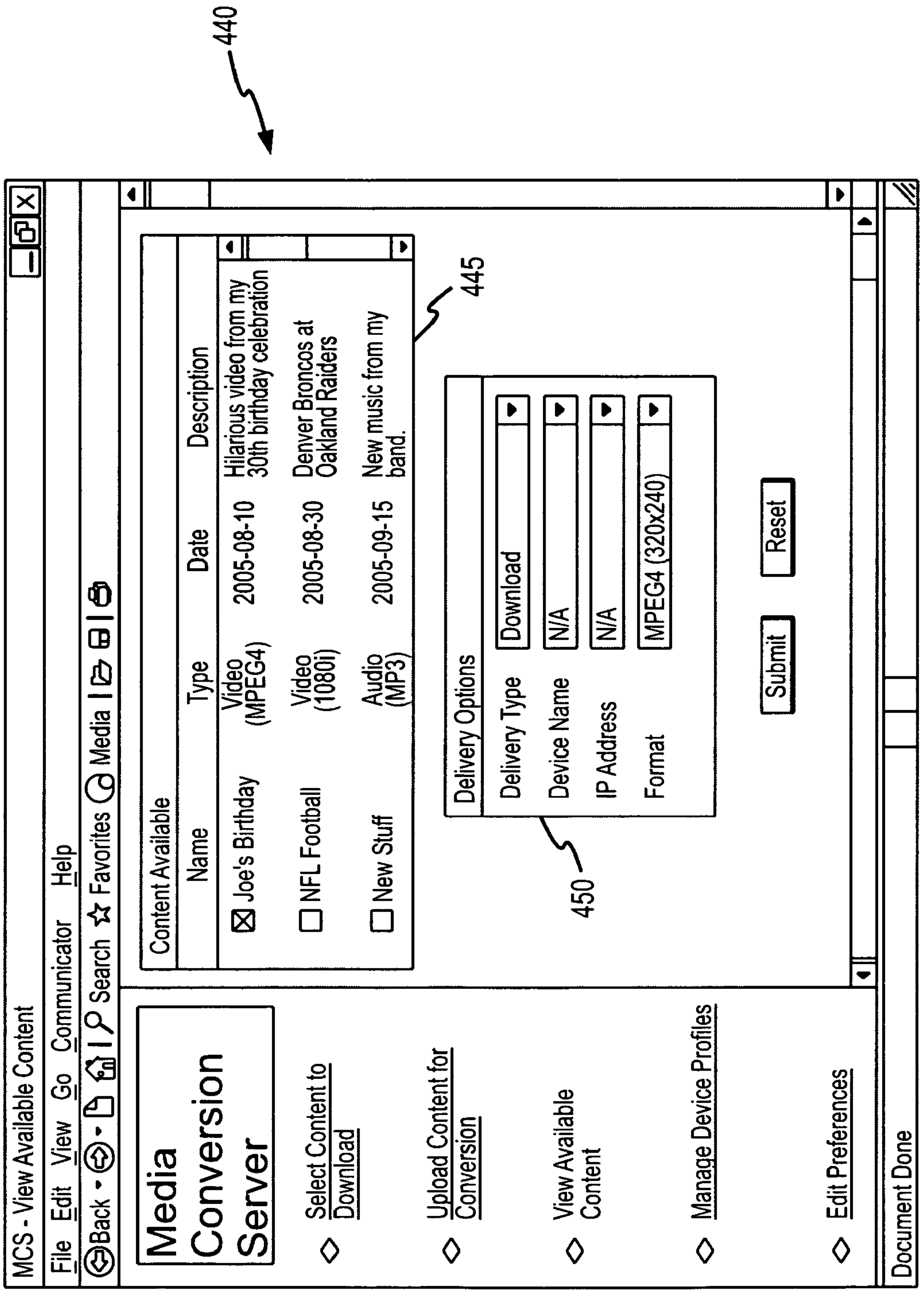

Returning again to FIG. 3, the obtained content may then be converted (block 330), perhaps as described above, and/or provided/delivered to the base station (block 335). Providing and/or delivering the content to the subscriber may take any of several forms, including without limitation those described in detail above. Merely by way of example, in a set of embodiments, the content may be transmitted to an NPVR for download to the base station. In another set of embodiments, as mentioned above, the content may be provided to the base station via a URL and/or RSS feed (e.g., on a web page, etc.), via electronic mail, etc. FIG. 4*c* illustrates an exemplary screen display 440 that may be used to allow a subscriber to view available content (which may comprise content that has previously been selected for delivery and/or conversion). The web page may include a window 445 that lists (and/or allows the user to select) various content, as well as, in some cases, a window 450 that allows the user to identify options (such as the delivery type, format, etc.) for the delivery of the content.

In a particular set of embodiments, the content may be provided to others as well (or as an alternative to providing the content to the subscriber) (block 340), perhaps using one (or more) of the delivery methods described above. (In particular, a web page such as that depicted by FIG. 4*c* may be made available to authorized users to request delivery of the content.) In some cases, as noted above the content may need to be converted into additional format(s) for use by others.

As noted above, in some cases, the content may not be immediately transferred to the base station. Merely by way of example, in certain embodiments, converted content may be stored (e.g., at a networked content store, an NPVR, etc.), such that the subscriber may download the content to the base station when desired (and/or the content may be downloaded later according to a schedule defined, for example, by the subscriber's preferences). Hence, it may be useful to notify the subscriber (and/or another) of the status of the conversion process (block 345). Examples include a notification that the conversion successfully completed, so that, for example, the subscriber is aware that she can download the content when desired, a notification that the conversion failed, so that, for example, the subscriber can re-initiate the conversion process if desired, and/or a notification that the conversion is pending. Other types of status notification are possible as well.

In a particular set of embodiments, the content can include on-demand content and/or real-time content (which may be provided by a ROD server). The NPVR Applications describe in detail how on-demand and real-time content may be provided to a variety of subscriber devices, including without limitation a base station in accordance with embodiments of the present invention. Further, the base station of various embodiments may be configured to implement/support personal broadcast channels ("PBC"), as described more fully in the NPVR Applications.

In accordance with embodiments of the invention, there may be a fee associated with conversion services. The fee may be a subscription-based fee (such as a monthly fee, etc.) and/or may be billed on a per-conversion basis. In some cases, the fee may comprise a licensing fee related to the content and/or a service charge for the conversion service itself. Hence, after a conversion has successfully been performed, the subscriber may be charged a fee for the conversion (block 350) (if, for example, the system is configured with a per-conversion fee). There are a wide variety of billing methods known in the art, and any of them may be used as appropriate. Merely by way of example, the subscriber's profile might include a credit card number, and/or the subscriber may be asked to provide a credit card number upon requesting a conversion, such that the credit card may be billed the conversion fee. Alternatively, if the subscriber has a monthly billing relationship with the provider of conversion services, the fee may be added to a monthly invoice, etc. Other forms of payment, including for example, e-cash, direct debit, and/or the like, may be used as well.

The notification can take any suitable form, including those described elsewhere herein. Merely by way of example, the notification may comprise an email message; a SMS message; an instant message; a voice mail; a pop-up window (or other similar notification) on the subscriber's PC, television, etc.; and/or the like. Like other features, whether notification should occur (and the type of notification) may be defined by subscriber preferences and/or stored in a subscriber profile.

It should be noted that the methods, systems and devices discussed above are intended merely to be exemplary in nature. Consequently, various embodiments may omit, substitute and/or add various procedures and/or components as appropriate. For instance, it should be appreciated that in alternative embodiments, the methods may be performed in an order different than that described.

It should also be appreciated that the methods described above may be performed by hardware components and/or software programs, and thus may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods described above. In particular embodiments, for example, there may be a plurality of software components configured to execute on various hardware devices (such as an NPVR, ROD server, MCS, etc.). Alternatively, the methods may be performed by a combination of hardware and software.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for obtaining on-demand media content at a base station for use on a portable media device, comprising:

receiving a request for on-demand media content from a subscriber, wherein the subscriber subscribes to a service to receive the on-demand media content;

sending the request for the on-demand media content from the base station to an on-demand media content source;

receiving the on-demand media content at the base station;

storing the on-demand media content on a storage device in communication with the base station;

transferring the recorded media content from the base station to the portable media device; and wherein the base station is a subscriber device.

2. The method of claim 1, further comprising:

sending a payment for the on-demand media content.

3. The method of claim 1, wherein:

the request is generated by a user of the base station.

4. The method of claim 1, wherein:

the request is generated by a processor associated with the base station based upon rules entered into the base station by a user.

5. The method of claim 1, wherein:

the request includes a time for delivering the on-demand media content to the base station.

6. The method of claim 1, further comprising:

monitoring signal strength of the on-demand content received by the base station.

7. The method of claim 1, wherein:

the portable media device comprises a wireless phone.

8. The method of claim 1, wherein:

the storage device is a one of a hard-drive, a memory card and a flash memory.

9. The method of claim 1, further comprising:

formatting the on-demand media content for display on the portable media device prior to storing the on-demand media content on the storage device.

10. The method of claim 1, further comprising:

compressing the on-demand media content prior to storing the on-demand media content on the storage device.

11. The method of claim 1, further comprising:

digitizing the on-demand media content prior to storing the on-demand media content on the storage device.

12. The method of claim 1, further comprising:

recording the transferred media content on the portable media device.

13. A method of providing content to a base station for a portable media device on-demand in a content-on-demand environment, the method comprising:

receiving a request from a subscriber to monitor at least one source of real-time on-demand content;

the base station monitoring at least one source of real-time on-demand content, wherein the base station is a subscriber device;

identifying a set of real-time on-demand content to provide to a subscriber;

obtaining, at the base station, the identified set of real-time on-demand content wherein the base station is the subscriber's device;

maintaining the identified set of real-time on-demand content at a storage device in communication with the base station; and transferring the identified set of real-time on-demand content from the base station to the portable media device.

14. A system of providing content to a base station for a portable media device on-demand in a content-on-demand environment, the system comprising one or more computers configured to perform the method of claim 13.

15. The method of providing content to a base station for a portable media device on-demand in a content-on-demand environment as recited in claim 13, wherein the portable media device is a wireless phone.

16. The method of providing content to a base station for a portable media device on-demand in a content-on-demand environment as recited in claim 13, the method further comprising:

determining that the identified set of real-time on-demand content has expired; and based on a determination that the identified set of real-time on-demand content has expired, discontinuing the maintenance of the real-time content, such that the real-time content is no longer available on-demand to the subscriber.

17. The method of providing content to a base station for a portable media device on-demand in a content-on-demand environment as recited in claim 13, wherein:

the set of real-time on-demand content is a first set of real-time on-demand content; and determining that the first set of real-time on-demand content has expired comprises identifying a second set of real-time on-demand content that supersedes the first identified set of real-time on-demand content.

18. The method of providing content to a base station for a portable media device on-demand in a content-on-demand environment as recited in claim 13, wherein determining that the set of real-time on-demand content has expired comprises determining that a relevance window associated with the set of real-time on-demand content has expired.

19. The method of providing content to a base station for a portable media device on-demand in a content-on-demand environment as recited in claim 13, wherein the set of real-time on-demand content is a first set of real-time on-demand content, the method further comprising:

identifying a second set, of real-time on-demand content that should be provided to the subscriber;

obtaining the second set of real-time on-demand content;

determining that the second set of real-time on-demand content supersedes the first set of real-time on-demand content; and providing the second set of real-time on-demand content to the base station on-demand, such that the second set of real-time on-demand content replaces the first set of real-time on-demand content and is available in real-time to the subscriber.

20. The method of providing content to a base station for a portable media device on-demand in a content-on-demand environment as recited in claim 13, wherein the content-on-demand environment comprises a video-on-demand distribution network.

21. The method of providing content to a base station for a portable media device on-demand in a content-on-demand environment as recited in claim 20, wherein the video-on-demand distribution network comprises at least one of a group consisting of:

a cable television distribution network;

a satellite television distribution network; and an xDSL video distribution network.

22. The method of providing content to a base station for a portable media device on-demand in a content-on-demand environment as recited in claim 13, wherein transferring the identified set of real-time on-demand content from the base station to the portable media device comprises:

notifying the subscriber that the identified set of real-time on-demand content is available.

23. The method of providing content to a base station for a portable media device on-demand in a content-on-demand environment as recited in claim 22, wherein notifying the subscriber comprises displaying an indicator on one of the base station and the portable media device.

24. The method of providing content to a base station for a portable media device on-demand in a content-on-demand environment as recited in claim 22, wherein notifying the subscriber comprises transmitting to the portable media device one of a text message and an e-mail message.

25. The method of providing content to a base station for a portable media device on-demand in a content-on-demand environment as recited in claim 13, wherein transferring the identified set of real-time on-demand content from the base station to the portable media device comprises:

transmitting identified set of real-time on-demand content to the base station at a specified time.

26. The method of providing content to a base station for a portable media device on-demand in a content-on-demand environment as recited in claim 25, wherein the specified time is determined by one of the subscriber and a processor associated with the base station.

27. The method of providing content to a base station for a portable media device on-demand in a content-on-demand environment as recited in claim 13, the method further comprising:

storing the identified set of real-time on-demand content.

28. The method of providing content to a base station for a portable media device on-demand in a content-on-demand environment as recited in claim 27, wherein storing the identified set of real-time on-demand content comprises storing the identified set of real-time on-demand content on at least one network storage device selected from the group consisting of:

a network media recorder; and a network content library.

29. The method of providing content to a base station for a portable media device on-demand in a content-on-demand environment as recited in claim 13, wherein providing the identified set of real-time on-demand content comprises inserting the identified set of real-time on-demand content into a stream of on-demand content.

30. The method of providing content to a base station for a portable media device on-demand in a content-on-demand environment as recited in claim 13, wherein the set of real-time on-demand content comprises a video stream.

31. The method of providing content to a base station for a portable media device on-demand in a content-on-demand environment as recited in claim 30, wherein the video stream is selected from the group consisting of:

a high-bit-rate digital video stream;
a low-bit-rate digital video stream;
an MPEG video;
a proprietary video format;
a digital video file; and
an analog video stream.

32. The method of providing content to a base station for a portable media device on-demand in a content-on-demand environment as recited in claim 13, wherein the set of real-time on-demand content comprises an audio stream.

33. The method of providing content to a base station for a portable media device on-demand in a content-on-demand environment as recited in claim 13, wherein the set of real-time on-demand content comprises a report selected from the group consisting of:

a traffic report;
a stock report;
a news report;
a weather report; and
urgent public information.

34. The method of providing content to a base station for a portable media device on-demand in a content-on-demand environment as recited in claim 13, wherein the set of real-time on-demand content is selected from the group consisting of:

a voice mail message;
an email message;
a fax message;
a text message; and
an instant message.

* * * * *

UNITED STATES PATENT AND TRADEMARK OFFICE

CERTIFICATE OF CORRECTION

PATENT NO. : 7,654,462 B2
APPLICATION NO. : 11/292210
DATED : February 2, 2010
INVENTOR(S) : Steven M. Casey It is certified that error appears in the above-identified patent and that said Letters Patent is hereby corrected as shown below:

In the Drawings:
Figure 4a, Box 410, replace "Joe's Bas Station" with "Joe's Base Station", therefor.

Column 2, Line 64, replace "embodiment" with "embodiments", therefor.

Column 5, Line 60, replace "provider" with "provide", therefor.

Column 6, Line 34, replace "The" with "the", therefor.

Column 7, Line 6 and 7, replace "which are may be prepaid." with "which may be prepaid.", therefor.

Signed and Sealed this

Thirteenth Day of April, 2010

David J. Kappos
*Director of the United States Patent and Trademark Office*

UNITED STATES PATENT AND TRADEMARK OFFICE

CERTIFICATE OF CORRECTION

PATENT NO. : 7,654,462 B2
APPLICATION NO. : 11/292210
DATED : February 2, 2010
INVENTOR(S) : Steven M. Casey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this

Twenty-third Day of November, 2010

David J. Kappos

*Director of the United States Patent and Trademark Office*